Patented Mar. 9, 1926.

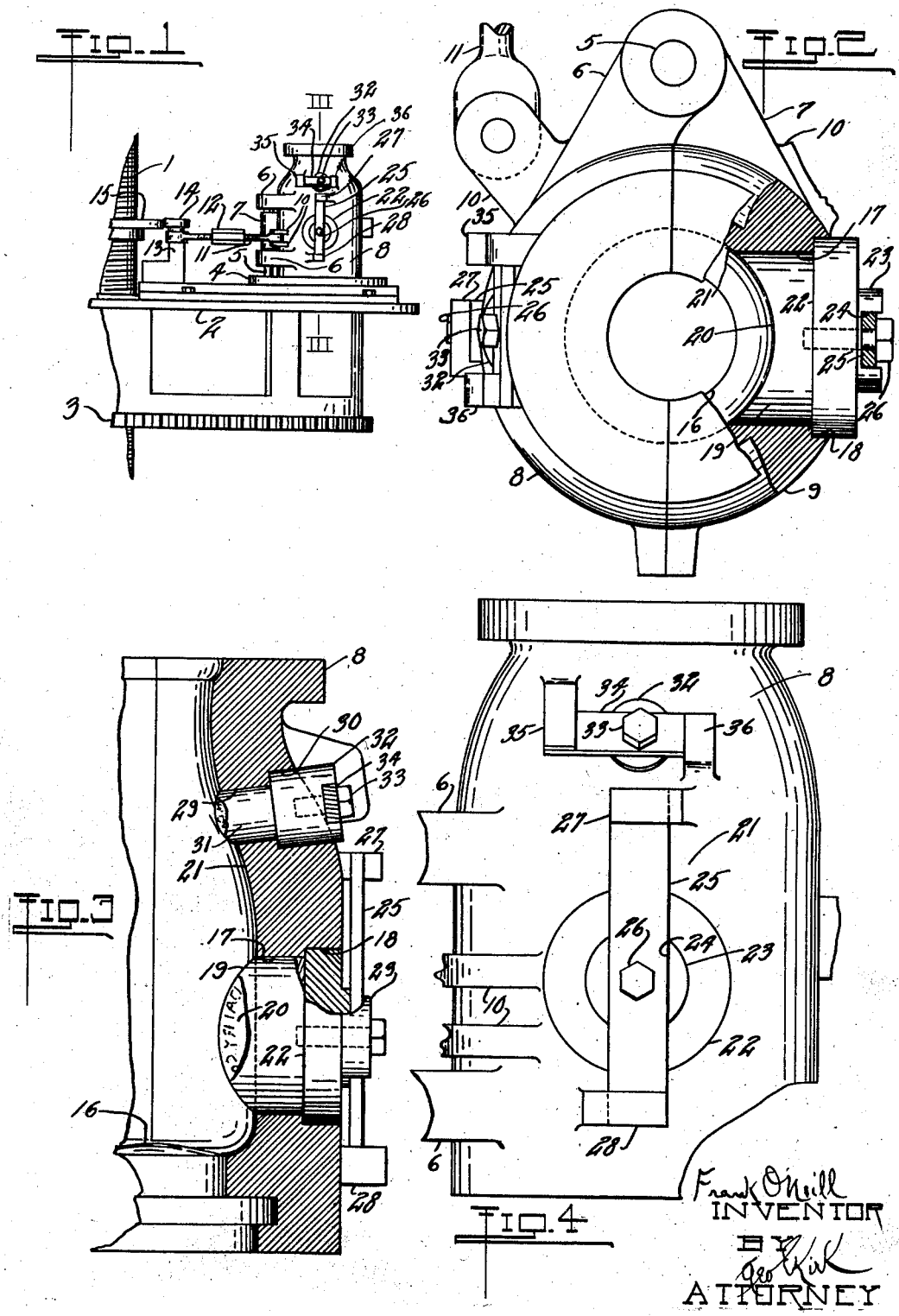

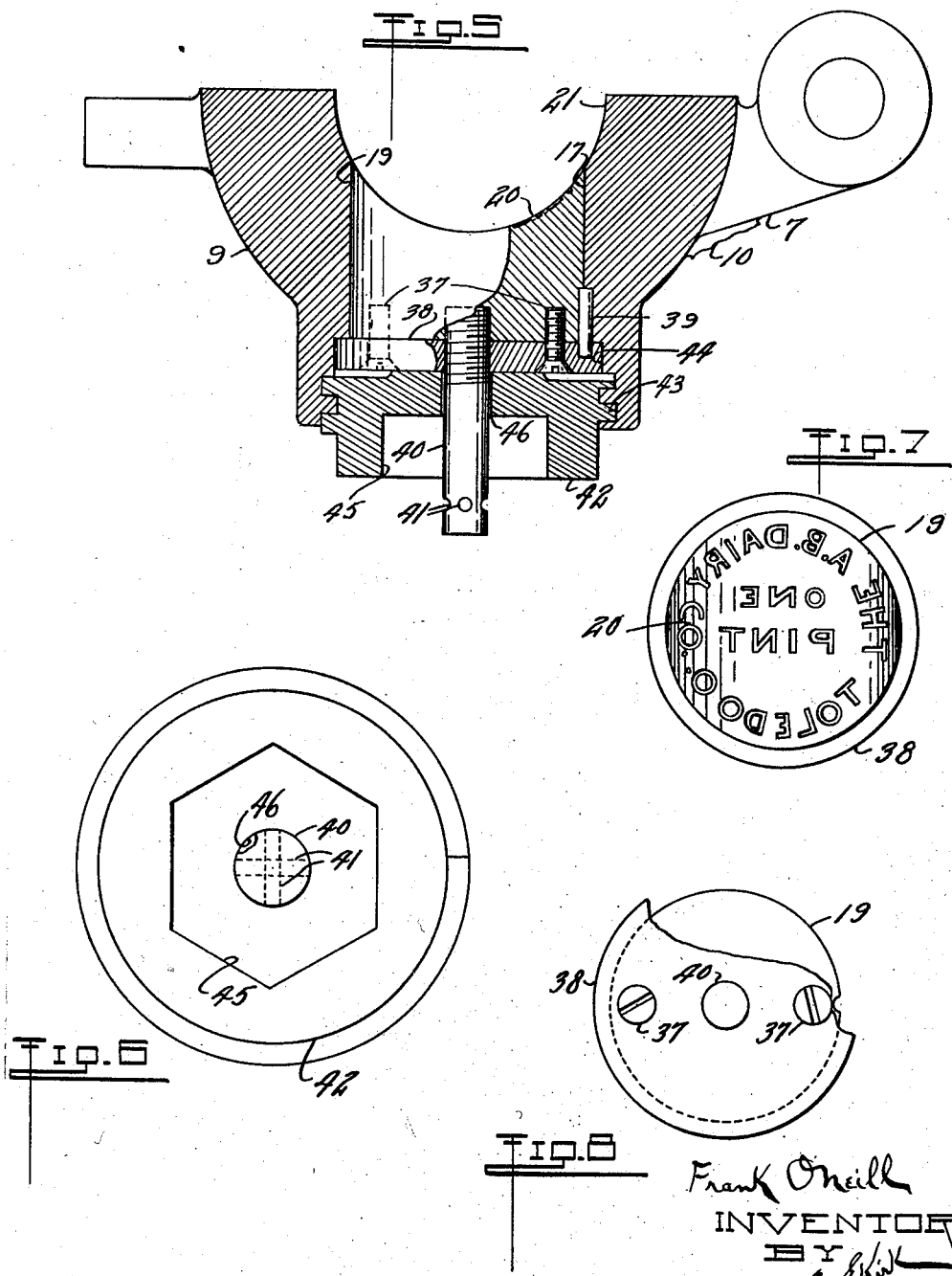

1,576,212

UNITED STATES PATENT OFFICE.

FRANK O'NEILL, OF TOLEDO, OHIO.

MOLD MARKER MOUNTING.

Application filed July 10, 1924. Serial No. 725,273.

*To all whom it may concern:*

Be it known that I, FRANK O'NEILL, a citizen of the United States of America, residing at Toledo, Lucas County, Ohio, have invented new and useful Mold Marker Mountings, of which the following is a specification.

This invention relates to mold replacement parts.

This invention has utility when adapted for interchangeable markers as externally insertable into molds for glassware, as in bottles say of the milk type.

Referring to the drawings:

Fig. 1 is a fragmentary view of an embodiment of the invention in connection with a mold for a milk bottle as mounted on a bottle machine of the turret type, say as shown in applicant's Patent No. 1,462,652 of July 24, 1923;

Fig. 2 is a view on an enlarged scale in plan, with parts broken away, of the mold of Fig. 1;

Fig. 3 is a view, with parts broken away, showing the assembly of markers in the mold of Fig. 1, such view being approximately on the line III—III, Fig. 1;

Fig. 4 is a side elevation on an enlarged scale of the mold of Fig. 1, with markers in position therewith;

Fig. 5 is a horizontal section of a mold section and externally insertable marker as anchored therewith by a nut;

Fig. 6 is a plan view of the nut for mounting the marker of Fig. 5;

Fig. 7 is a face view of the marker; and

Fig. 8 is a view of the assembly mounting means for the marker of Fig. 5, omitting the nut of Fig. 6, parts being broken away.

Column 1 is shown as having blow table 2 provided with gear 3 to effect intermittent rotation of the table 2. Fixed bracket 4 on the table 2 carries pivot pin 5 upon which are mounted ears 6, 7, of mold sections 8, 9. These mold sections in addition to the mounting ears as engaging the fulcrum pin 5, are provided with ears 10 disposed to clear the desired marking region for the molds, and in this instance these are disposed rearwardly from the mold proper. Links 11 as adjustable by nuts 12 extend to crosshead 13 carrying roller 14 coacting with cam 15 in determining closed position for the mold sections 8, 9, during certain portions of the travel of such mold sections with the table 2. Such mold sections as in closed position are held by the cam 15 to embrace bottom 16 carried by the table 2 and thereby complete a mold.

Identification of ware, especially glassware, is conveniently made during the molding or blowing operation by insignia or other lettering as incorporated in a marker. In custom work, mold sections 8, 9, may to the extent desired, as to either or both thereof, provide seats for removable markers. Thus, a common mold for a standard shape or size of article or bottle may be used in putting out special ware for different purposes or customers.

As herein disclosed there is shown a milk bottle mold having a mold section thereof provided with primary seat 17 and secondary seat 18. A cylindrical marker 19 having marking face 20 may snugly fit in the recess or seat 17 as an aperture through side wall 21 of the mold section 8. As herein disclosed this marker 19 may be inserted in the aperture or recess 17 from the exterior of the mold section 8. This is made possible by the fact that the seat 17 extends or is in direct communication with the exterior of the mold section 8. In effecting this mounting, the marker 19 carries washer or plate 22 having boss 23 provided with seat 24 in which is mounted spring plate 25 by assembly bolt 26 extending through the plate 22 to coact with the marker 19. The arms of the spring plate 25 may be engaged by a tool as the marker 19 is inserted in the primary seat 17 and the follower plate 22 enters the secondary seat 18.

This tool may be given a slight right-hand turn to bring the arms of the plate 25 into slightly inwardly deflected position under ears 27, 28, in thereby yieldably locking the marker 19 in mounted position in the recess or aperture 17. This spring holding is additionally a locking, and, furthermore, is a bringing of the marker 19 into registry position as the edges of the plate 25 come into fully swung position against the inward sides of the respective ears 27, 28. The fact that the ear 27 is farther from the bolt 26 insures that this registry position of the marker can occur only in the desired right side up position for the lettering or other symbols 20 on the marker 19.

This side marker 19 as herein shown may in milk bottle work provide the identification of volume, as one pint-contents, and the identification of the bottler or dairy as to name and location. Other insignia may be placed, or an identifying insignia if desired, upon the companion mold section 9. Furthermore, a supplemental marking may be effected, say of register number for the dairy or bottling plant. To this end, the mold section 8 may be provided with a supplemental cylindrical seat or aperture 29 with secondary seat 30 to permit insertion of marker 31 carrying plate 32 as assembled by bolt 33, also coacting with spring plate 34. Rotation here, as in the instance of the plate 25, effects locking of this minor marker 31 in register assembly position in the mold section 8 as the plate 34 comes snugly into fully thrown position in coacting with ears 35, 36.

Instead of mounting the marker as described and shown in Figs. 1, 2, 3, 4, such marker 19 may have connected thereto, by bolts 37, plate 38 carrying key 39 for effecting non-rotative registry position of the marker 19 as to the recess or seat 17. This plate 38 also has pin or bar 40 extending through to engage the marker 19. This bar 40 may serve as a handle for insertion of the marker in register position in the mold section 9. As so inserted, a tool, which may coact with seats 41 in the stem or handle 40, may be removed and nut 42 thrust into position and rotated to have screw threaded engagement with threaded seat 43 exterior of seat 44 with which the plate 38 coacts as a secondary seat from the seat 17.

Polygonal seat 45 in the nut 42 may be engaged by a wrench for effecting this locking rotation in moving the marker 19 axially of said nut 42 into snugly fitting home position in the mold section 9. This nut 42 has central recess 46 through which the handle or stem 40 may protrude.

To effect removal of this mold section 9 as mounted by the nut 42, it is only necessary to unscrew the nut 42 and then by a tool grip the handle 40 to pull the mold marker 19 away from the mold section 9. This can be done with the table 2 maintaining its intermittent rotation and a substitute mold section inserted without stopping the machine. This means a factor of economy and increased production wherein custom ware for different trade is being put out from the same machine. The quick change as effected from the nut release 42 is readily accomplished by the counter-clockwise rotation of the spring plate 25, or 34, in the removal and replacement of these markers 31, 19.

This means that in ware production there may be continuity in machine operation, and with a dexterous operator, even continuous ware production if the substitute marker may be heated up so that as placed in the mold it may at once be effective in the production of commercial ware.

With a machine of say six stations at the blow table, the operator might be able from the take-off and before the transfer, to get the old section out and the substitute section in. However, in practice, it may be more acceptably worked out to have the machine miss a feed so that the complete cycle on the blow table may be used for the substitution of the marker or markers as desired.

As herein disclosed, the markers 19 may be of general application. However, herein the markers 19 may be integral with the plate 22 or 34 as a plate unit.

What is claimed and it is desired to secure by United States Letters Patent is:

1. A mold having a side wall with an aperture therethrough, a marker for the mold produced article insertable from exterior of the mold directly into said aperture into aperture closing position, and yieldable locking means angularly shiftable over the mold side wall adjacent the aperture for flexing in anchoring the marker in aperture closing position.

2. A mold having a side wall with an aperture therethrough and a wedge seat, a circular marker for the mold produced article insertable from exterior of the mold directly into said aperture into aperture closing position, and register effecting locking means for anchoring the marker in aperture closing position including a stem extending axially of the marker and angularly shiftable means on said stem coacting as shifted to engage said wedge seat and wedge the marker into position in the mold.

3. A mold having a side wall provided with a seat, a marker insertable from exterior of the mold directly into said seat, and inward distance determining rotatable locking, and mounting means carried by the exterior portion of said marker and coacting with the mold for mounting the marker in position in said seat, including a transversely yieldable spring plate.

4. A mold having a side wall provided with a circular seat, a marker insertable from exterior of the mold directly into said seat, and inward distance determining rotatable locking, registering, and mounting means carried by the exterior portion of said marker and coacting with the mold for mounting the marker in position in said seat including a transversely yieldable wedge plate.

5. A marker for a bottle mold comprising a cylindrical section, and a relatively rotatable marker mounting and locking backing plate connected thereto, the mold having an opening for the marker, and a seat for said rotatable plate as rotatable relatively to the marker.

6. A marker for a bottle mold comprising a cylindrical section, and a relatively rotatable marker registering, mounting and locking backing plate connected thereto, the mold having an opening for the marker, and a seat for said rotatable plate as rotatable relatively to the marker.

7. A bottle mold provided with a cylindrical recess therethrough as a primary seat terminating in an external secondary seat, and a marker insertable past the secondary seat into said primary seat, there being relatively rotatable marker mounting, registering and locking means directly coacting with the secondary seat for holding the marker in position in the primary seat.

In witness whereof I affix my signature.

FRANK O'NEILL.